Patented Nov. 9, 1943

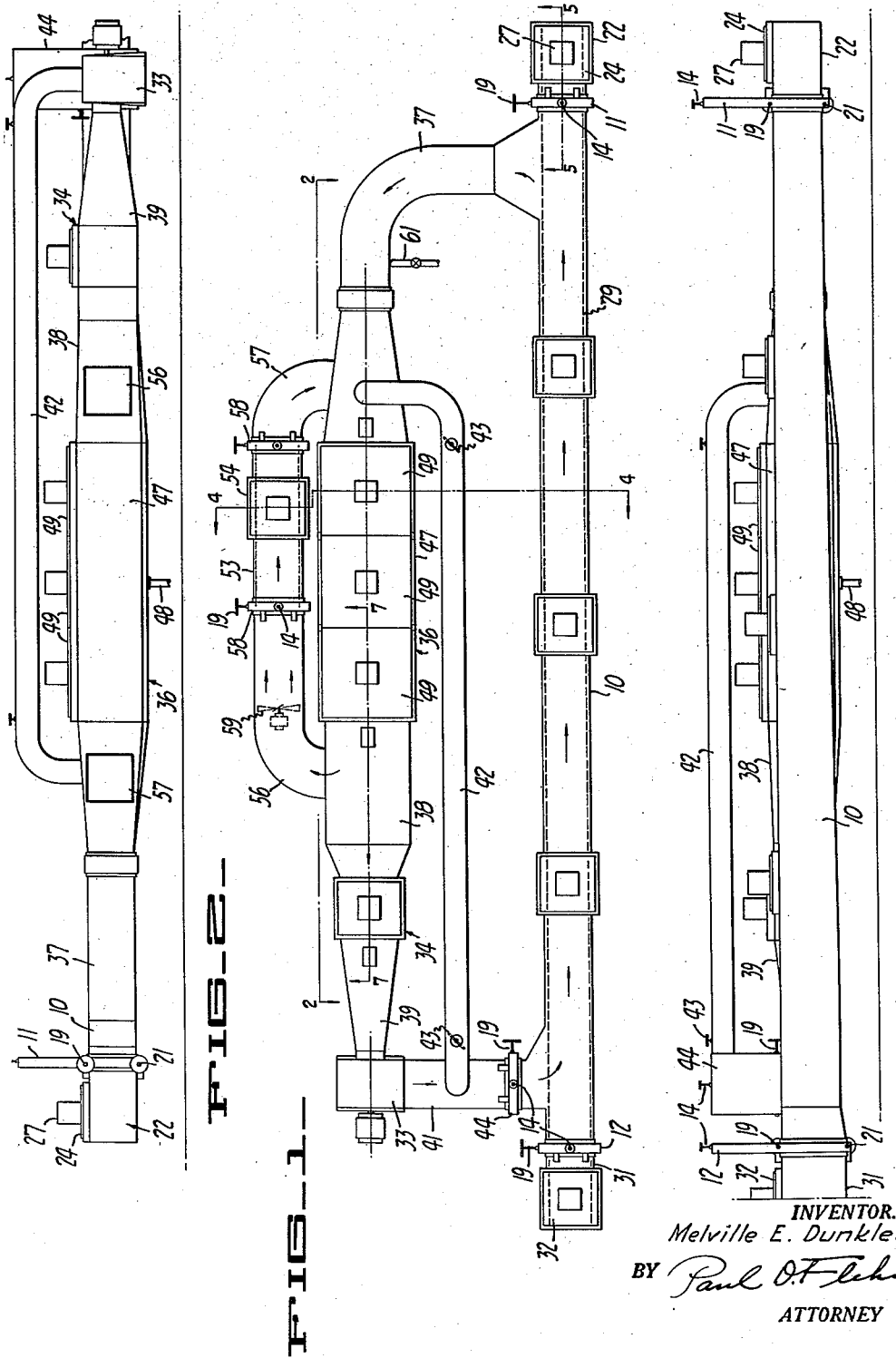

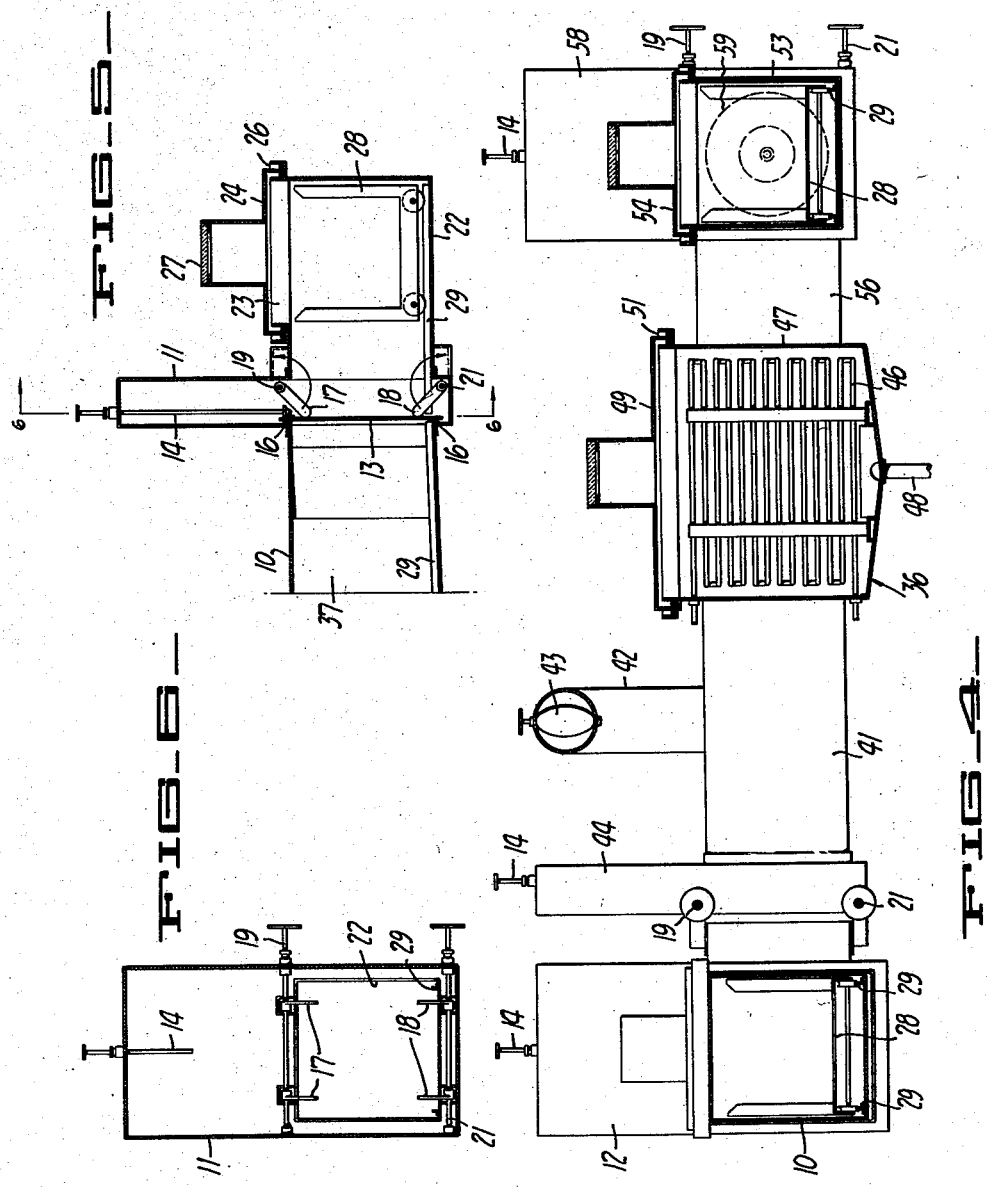

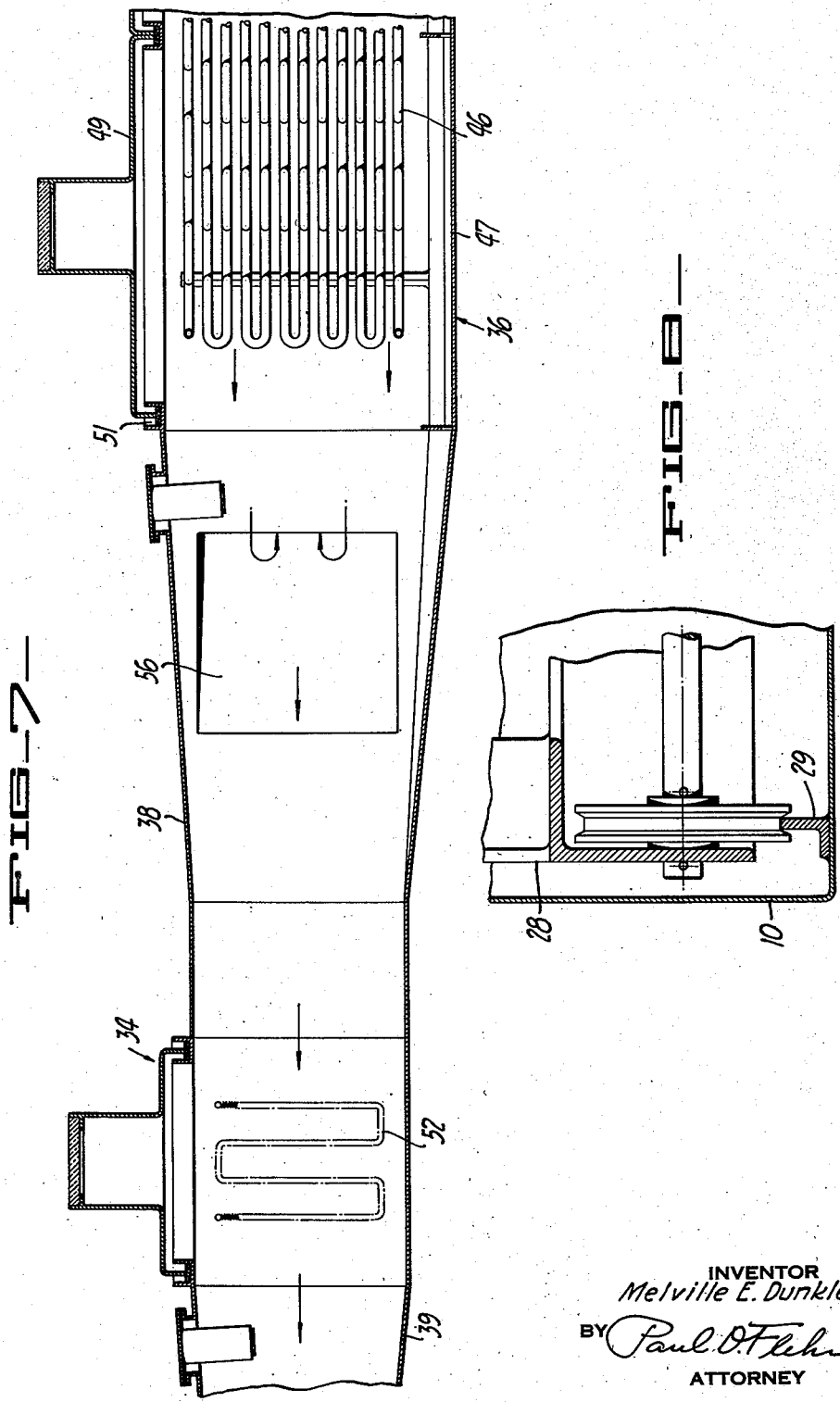

2,333,850

UNITED STATES PATENT OFFICE 2,333,850

METHOD FOR TREATMENT OF FOOD MATERIALS

Melville E. Dunkley, Vernalis, Calif.

Application April 10, 1939, Serial No. 266,936

5 Claims. (Cl. 99—204)

This invention relates generally to methods and apparatus for the treatment of food materials having a substantial moisture content, like green vegetables or fresh fruit, in order to produce dried or dehydrated products. The invention is also concerned with new products resulting from such processes.

It is a general object of the invention to provide an improved process and apparatus of the above character which will retain to a large extent the desirable properties of the original fresh material. In this connection I have particular reference to retention of flavor and color characteristics, as well as palatability and nutritive properties.

It is a further object of the invention to provide a process for producing a dried food product, which will avoid special treatments such as sulphuring, which are generally considered to be detrimental.

Another object of the invention is to provide new food products as a result of use of my process, having physical and chemical properties distinguishing them from products produced by conventional drying methods.

Further objects of the invention will appear from the following description in which the preferred embodiment of the invention has been set forth in detail in conjunction with the accompanying drawings.

Referring to the drawings:

Fig. 1 is a plan view illustrating apparatus for carrying out the present process.

Fig. 2 is a cross-sectional view of the apparatus shown in Fig. 1, taken along the line 2—2 of Fig. 1.

Fig. 3 is a side elevational view of the apparatus as illustrated in Fig. 1, looking toward the lower side of Fig. 1.

Fig. 4 is an enlarged cross-sectional view taken along the line 4—4 of Fig. 1.

Fig. 5 is an enlarged cross-sectional detail taken along the line 5—5 of Fig. 1.

Fig. 6 is a cross-sectional detail taken along the line 6—6 of Fig. 5.

Fig. 7 is an enlarged cross-sectional detail taken along the line 7—7 of Fig. 1.

Fig. 8 is an enlarged detail, in cross-section, illustrating the manner in which the trucks are tracked within the apparatus.

The process and method can be best understood after a description of the apparatus illustrated in the drawings. This apparatus is designed for continuous operation, in that batches of the material being treated are continually progressed during the drying cycle.

Referring first to Figs. 1 to 3 inclusive, the apparatus includes an elongated tunnel 10, which is proportioned in accordance with the capacity of the equipment desired. Near the ends of this tunnel manually operable gates 11 and 12 are provided, which can be opened to permit introduction and removal of material. A convenient construction for these gates is illustrated in Figs. 5 and 6. Briefly a sliding closure plate 13 is provided, which has its upper end connected to the sliding operating rod 14. In order to urge the closure 13 against its seat 16, two sets of fingers 17 and 18 are provided, and these fingers are mounted upon the shafts 19 and 21. It will be evident that when fingers 18 are turned to release the closure 13, the closure can be readily lifted to open position by pulling upwardly upon the rod 14. Also although the closure can be readily closed, a fair seal can be established by forcing it against the seat 16, by turning fingers 18 to the positions illustrated in Fig. 5.

On the inlet side of the gate 11 there is a loading extension 22, into which charges of material to be dried can be introduced. The upper side of extension 22 is shown provided with an opening 23, normally covered by the closure 24. This closure is shown provided with a liquid seal 26, in order to minimize leakage of gas. It is also shown provided with a window 27 through which the contents of the extension 22 can be viewed. It has been found convenient to make use of trucks 28, dimensioned so that they can be lowered down through the opening 23. The material to be dried is loaded upon the trucks 28, in such a manner as to promote contact of the material with the drying gas. For example in handling various vegetables and fruits, the material can be spread upon shallow trays, which in turn are stacked upon the trucks.

Extending longitudinally throughout the conduit 10, and also within loading extension 22, are the rails 29, forming a track upon which the trucks can operate. After a truck loaded with material to be dried is placed within the extension 22, it is evident that it can be advanced into the tunnel 10, by temporarily opening the closure 13. As trucks are so introduced into the tunnel 10 at successive intervals, a line of trucks is progressed through the tunnel 10, and when operating at full capacity a truck must be removed from the other end of the tunnel through gate 12, for each truck introduced through gate 11.

At the discharge end of the tunnel where gate 12 is located, there is an unloading tunnel extension 31 corresponding to the loading extension 22. The unloading extension 31 is likewise constructed to receive the trucks 28, and it is provided with a removable closure 32 through which the trucks can be removed.

A circulating system is provided whereby dry air can be circulated longitudinally through the drying tunnel 10. This system includes a blower 33, a heater 34, and cooling units 36. Near the loading gate 11 the tunnel 10 connects with a suction conduit 37, which in turn connects with the cooling units 36. Conduit 38 connects cooling units 36 with the heating unit 34, and this heating unit is connected by conduit 39 with the inlet of blower 33. Conduit 41 connects the discharge side of blower 33 with the tunnel 10, at a point near the unloading gate 12. In order to facilitate a proper control of drying gas, a by-pass conduit 42 can be provided, with one end of this conduit connected to the inlet side of cooling units 36, and the other end communicating with conduit 41. The by-pass conduit 42 is shown provided with one or more flow control dampers 43. Conduit 41 is shown provided with a gate valve 44, whereby the circulation of drying gas through the tunnel 10 can be interrupted, or can be controlled by varying setting of this valve.

The cooling units 36 can consist of refrigerated surfaces over which the drying gas is caused to pass. Thus as shown in Fig. 7 each cooling unit can consist of refrigerated pipes 46, disposed within the conduit housing 47. The bottom wall of the housing 47 can constitute a drainage pan, connected to the drain pipe 48 (see Fig. 2). The upper side of the housing 47 is shown covered by the closures 49, which can also be provided with liquid seals 51.

The heating unit 34 may make use of an electrical heating element over which the gas is caused to pass, or it may consist of water or steam heated pipes 52.

A by-pass is provided directly about the cooling unit 36, for the purpose of carrying out a freezing cycle. Thus a housing 53 is provided, having a removable cover 54, and so dimensioned that by removing this cover 54 a truck loaded with products to be treated can be placed within the housing. A conduit 56 connects one side of housing 53 with the conduit 38, and another conduit 57 connects the other side with the conduit 37. Gates 58 are provided to control communication between housing 53 and the conduits 56 and 57. A fan or blower 59 is shown disposed within conduit 56, for the purpose of causing a rapid circulation of gas through housing 53 and the cooling units 36. While one is circulating gas in this manner through housing 53, to the exclusion of the heating unit 34, gate 44 can be closed to interrupt circulation of gas through the main drying tunnel 10. As will be presently explained products placed within the housing 53 can be rapidly frozen, preliminary to the drying operation.

Use of the apparatus described above, and the carrying out of the present process, can be explained as follows: It will be presumed that one wishes to dry fruit such as apricots, peaches, apples, prunes, pears, or the like. The fruit is initially prepared as by removing the skin and pits, with the meat in halves or cut into slices. The fruit is then placed upon suitable trays which are stacked upon the trucks 28. A charged truck is now lowered into the housing 53, valves 58 opened, and fan 59 put into operation. Assuming that the pipes 46 of the cooling units are being suitably refrigerated, and that the gate 44 is closed, gas is circulated over the fruit and is continuously refrigerated so that its temperature drops substantially below freezing, as for example in the neighborhood of from 15 to 20° F. As a result with proper refrigerating capacity the fruit is rapidly frozen. After completely freezing the material, valves 58 are closed and the charged truck removed from housing 33, and lowered into the loading tunnel extension 22. It is then advanced into the drying tunnel 10, by temporarily opening the gate 11. Assuming that one has been operating the equipment over a substantial period of time, the tunnel 10 is filled with charged trucks, and as a truck containing frozen products is introduced into the loading extension 22, a truck is removed from the unloading extension 31. During intervals when one is not circulating cold gas through the conduits 53, gates 58 are closed and valve 44 opened, so that a circulation of drying gas occurs longitudinally of the tunnel 10, countercurrent to the advancement of material. The circulated gas is first refrigerated to a temperature below freezing, by passage through cooling units 36, whereby moisture is removed, and it is then reheated by the heating unit 34 to a temperature substantially above freezing. It is this dry gas which is then circulated through the drying tunnel 10.

It will be evident from the foregoing that while a charge of material is being frozen, it is desirable to reduce or interrupt circulation of gas through blower 33, and tunnel 10. This mode of operation involves no difficulties because the time required to freeze a typical charge of material is relatively short, whereas the time of treatment within tunnel 10 for complete drying will require many hours, as for example from 12 to 15 hours in a typical instance. Thus at intervals one may interrupt the drying cycle for the purpose of freezing a new charge of material, without seriously affecting efficiency.

I have found that the process described above will produce remarkable products from a variety of food materials. In general according to my observations the preliminary freezing serves to disrupt the cell structure of the material to a substantial degree, and this serves to facilitate subsequent evolution of moisture at temperatures which need not be sufficiently high to detrimentally affect color, flavor, and other natural properties of the material. For example in the treatment of a fruit like apricots, the drying gas (such as air) can be at temperatures in the neighborhood of from 33 to 45° F., and within this temperature range the fruit can be reduced to a moisture content of about 12 to 18%, within a reasonable period of time. The final product appears to have no tendency to spoil, and it does not have the toughness and darkened color characteristic of ordinary dried fruit. Color and flavor more nearly approximate the natural fresh color and flavor of the fruit, and the keeping qualities appear to be as good if not better than ordinary dried fruit. The product readily re-absorbs moisture and in this respect lends itself to household use, as distinguished from ordinary dried fruit requiring soaking in water for long periods of time, to re-absorb moisture.

Various fresh vegetables can also be treated by the same process, to produce high quality dried products. For example I can dry vegetables such as carrots, beans, peas, etc., after such materials have been properly washed and prepared for the process. In preparing vegetables it is desirable to cut them into pieces of suitable size, particularly since such fragments more readily lose moisture in the process. Vegetables dried by my process need not be placed in expensive sealed cans or containers, but may be packed in inexpensive wax cartons, or Cellophane packages.

In connection with dried fruit such as apricots, pears, apples or peaches, one can eliminate sulphuring treatment such as is commonly used in the dried fruit industry. Sulphuring of fruit is quite commonly applied both before and after drying, and it serves to lighten the color. With my process the dried product has a relatively light color, without resorting to such treatment. It is commonly recognized that sulphuring is detrimental, because invariably it affords a certain amount of sulphur contamination.

Previous reference has been made to the fact that the characteristics of the final product more nearly conform to the natural characteristics of the fresh material. In this connection it can be further explained that my process, in that it does not involve use of elevated temperatures, tends to preserve and retain aromatic components of the material, including components which influence flavor, odor and color.

It is generally considered that one should avoid freezing of food products, unless one intends to retain the material in frozen condition for preservation. I have found however that freezing does not detrimentally affect keeping qualities, if immediately followed by a drying cycle as explained above. It may be pointed out in connection with the drying cycle that the material when introduced into tunnel 10, is frozen. It is thawed out within this drying tunnel during the course of the drying cycle. In a typical instance where the freezing of a product has required say 5 minutes, not more than about 30 minutes will be required to completely thaw the material in tunnel 10, with a drying temperature of about 35° F.

In the treatment of certain types of material, it is desirable to maintain a non-oxidizing atmosphere within the apparatus. Since my apparatus makes use of a closed circulation, one can continuously bleed a certain amount of an inert gas such as carbon dioxide, into the apparatus, whereby oxygen of the air is excluded. For this purpose I have indicated a pipe 61 which can be connected to a suitable source of inert gas, such as carbon dioxide or nitrogen, for introduction into the apparatus. The use of such an inert atmosphere further minimizes impairment of color, flavor, and other natural characteristics of the fresh material. In addition it permits use of somewhat higher drying temperatures without causing formation of spores or molds such as require oxygen for their growth. Thus in drying fruit like apricots, higher drying temperatures such as of the order of 85° F., can be used, since such temperatures give more rapid and efficient drying, and are less than the scalding temperature at which color and flavor components are seriously impaired.

I claim:

1. The method of treating solid food material having a fibrous cell structure containing substantial amounts of water, which comprises, freezing said food materials to disrupt said cell structure to a substantial degree, contacting said food materials while still frozen with a current of drying gas having a temperature sufficiently high to thaw said food materials but below the scalding temperature at which the color and flavor components of the food material being treated are substantially impaired, and thawing said food materials in contact with said gas and removing water therefrom by evaporation into said gas to form a dried food product, the major portion of said evaporation being carried out after said thawing.

2. The method of treating solid food material having a fibrous cell structure containing substantial amounts of water, which comprises, freezing said material to disrupt said cell structure to a substantial degree, contacting said food material while still frozen with a current of non-oxidizing drying gas having a temperature sufficiently high to thaw said food material but below the scalding temperature at which the color and flavor of the food material being treated are substantially impaired, and thawing said food material in contact with said gas and removing water therefrom by evaporation into said gas to form a dried food product, the major portion of said evaporation being carried out after said thawing.

3. The method of treating solid food material having a fibrous cell structure containing substantial amounts of water, which comprises, freezing said food material by contacting the same with a current of cold inert gas to disrupt said cell structure to a substantial degree, thereafter contacting said food material while still frozen with a current of inert drying gas having a temperature sufficiently high to thaw said food material but below the scalding temperature at which the color and flavor of the food material are substantially impaired, and thawing said food material in contact with said gas and removing water therefrom by evaporation into said gas, the major portion of said evaporation being carried out after said thawing.

4. The method of treating fresh vegetables having a fibrous cell structure containing substantial amounts of water, which comprises, freezing said vegetables to disrupt said cell structure to a substantial degree, contacting said vegetables while still frozen with a current of drying gas having a temperature sufficiently high to thaw said vegetables but below the scalding temperature at which the flavor and color of said vegetables are substantially impaired, and thawing said vegetables in contact with said gas and removing water therefrom by evaporation into said gas to form a dried food product, the major portion of said evaporation being carried out after said thawing.

5. The method of treating fresh fruits in solid form having a fibrous cell structure containing substantial amounts of water, which comprises, freezing said fruits to disrupt said cell structure to a substantial degree, contacting said fruits while still frozen with a current of drying gas having a temperature sufficiently high to thaw said fruits but below the scalding temperature at which the color and flavor of said fruits are substantially impaired, and thawing said fruits in contact with said gas and removing water from the fruits by evaporation into said gas to form a dried fruit product, the major portion of said evaporation being carried out after said thawing.

MELVILLE E. DUNKLEY.